US005726251A

United States Patent [19]
Wilkinson et al.

[11] Patent Number: 5,726,251
[45] Date of Patent: Mar. 10, 1998

[54] POWDER COATINGS OF AMINE-REACTIVE RESINS AND AMINE CARBAMATE SALTS

[75] Inventors: Steven Paul Wilkinson, Coopersburg; Jeffrey Thomas DePinto, Emmaus, both of Pa.

[73] Assignee: Air Products and Chemicals, Inc., Allentown, Pa.

[21] Appl. No.: 730,535

[22] Filed: Oct. 11, 1996

[51] Int. Cl.$^6$ .............. C08L 33/14; C08L 63/02; C08L 67/06; C08L 75/04
[52] U.S. Cl. .............. 525/327.3; 525/327.4; 525/421; 525/447; 525/452; 525/453; 525/523
[58] Field of Search .............. 525/327.3, 523; 562/433, 555

[56] References Cited

U.S. PATENT DOCUMENTS

| | | | |
|---|---|---|---|
| 3,096,314 | 7/1963 | Stivers et al. | 260/87.7 |
| 3,320,187 | 5/1967 | Burt | 260/2.5 |
| 3,344,175 | 9/1967 | Canfield | 260/514 |
| 3,425,964 | 2/1969 | Stanley | 260/2.5 |
| 3,635,908 | 1/1972 | Vogt et al. | 260/77.5 AA |
| 3,971,785 | 7/1976 | Messina et al. | 264/268 |
| 4,017,447 | 4/1977 | Larsen et al. | 523/455 |
| 4,072,795 | 2/1978 | Noonan | 428/379 |
| 4,102,801 | 7/1978 | Brodoway | 252/182 |
| 4,111,917 | 9/1978 | Larsen | 528/45 |
| 4,469,856 | 9/1984 | Rasshofer et al. | 528/45 |
| 4,483,888 | 11/1984 | Wu | 427/336 |
| 4,526,721 | 7/1985 | Richardson | 260/404.5 |
| 4,639,476 | 1/1987 | Tajiri et al. | 523/444 |
| 5,223,638 | 6/1993 | McGhee et al. | 560/24 |
| 5,288,766 | 2/1994 | Narayan et al. | 521/128 |
| 5,308,895 | 5/1994 | Gan et al. | 528/91 |
| 5,387,619 | 2/1995 | Lee et al. | 521/133 |
| 5,399,597 | 3/1995 | Mandel et al. | 523/342 |

FOREIGN PATENT DOCUMENTS

| | | |
|---|---|---|
| 203381 | 10/1982 | Czechoslovakia . |
| 203548 | 1/1983 | Czechoslovakia . |

*Primary Examiner*—Robert E. Sellers
*Attorney, Agent, or Firm*—Mark L. Rodgers

[57] ABSTRACT

A method is described wherein a compound containing amine functionality is reacted in its liquid form with carbon dioxide to convert the compound into a solid amine carbamate salt for use as a blocked amine curative in powder coating manufacturing and resulting powder coating operations. The blocked amine curative decomposes on heating and reverts back to a liquid amine providing a highly reactive curative and flow modifier for powder coating applications.

5 Claims, No Drawings

POWDER COATINGS OF AMINE-REACTIVE RESINS AND AMINE CARBAMATE SALTS

STATEMENT REGARDING FEDERALLY SPONSORED RESEARCH OR DEVELOPMENT

Not Applicable.

CROSS-REFERENCE TO RELATED APPLICATIONS

Not Applicable.

TECHNICAL FIELD OF THE INVENTION

The present invention relates to curatives for use in making powder coatings and in applications using the resultant powder coatings.

BACKGROUND OF THE INVENTION

One method for forming a coating on a particular substrate is to electrostatically deposit a powder using an electrostatic spray gun or fluidized bed equipment. In electrostatic spray processes, the powders are typically passed through a high voltage field within a stream of air to attain an electrostatic charge. The substrate to be coated attracts these charged particles and is then placed in an oven where the powders melt flow and cure. For fluidized bed applications the substrate to be coated is heated to a temperature above the melt and cure temperature of the powder, and is then passed through a fluidized cloud of the coating powders. The particles melt, flow and cure while inside this heated chamber. The resultant powder coatings from these processes tend to be ~0.6–50 mils thick.

The typical process for preparing powder coatings is to first preform a dry mix of all the ingredients. Typical ingredients include a polymeric resin and a curing agent along with other additives such as flow modifiers, pigments, light stabilizers, and the like. This dry mix is then fed into an extruder to form an intimate mixture in the molten state at temperatures of about 100°–200° C. The curing agent needs to be blocked so that a reaction between the polymer resin and curing agent does not occur in the extruder while intimate mixing is taking place. If the curing agent is not blocked, the extrudate temperature should be maintained below the curing temperature so that gelation does not occur. This limits the prior art powder coating resins to high temperature resins.

The extrudate is then cooled using chill rollers and subsequently mechanically flaked. A mill is used to grind these flakes to provide particles for the powder process. The particles are typically 20–50 micron in size. A major disadvantage associated with particles prepared by this process is their non-uniform particle size and the non-homogeneous mixture of polymer, curing agent and additives throughout these particles.

During the final coating process the curing agents must be heated to high temperatures, typically above 150° C., to deblock their reactive functionality. This occurs after the powders have been deposited onto the coating substrate which has entered an oven for final flow and cure of the coating. The need for using an extruder as well as the presently available blocked curing agents limits the choice of substrate to be coated. Typically, only metals can be powder coated as the high temperatures required to deblock the curing agents would burn wood products or melt certain plastics.

A method is thereby required that allows uniform particles to be prepared that contain a uniform mixture of polymer and curing agent. The current extruders may run at temperatures as low as 95° C.; however, at these temperatures it may be difficult to melt the polymer and provide sufficient flow to create a homogeneous mixture of resin and curative. The need to eliminate the extruder to provide the intimate mixing is also a current goal of some powder coating manufacturers. Removing the extruder would allow for polymeric particles to be prepared that cure at lower temperatures to enable powder coating of wood and/or plastic substrates.

One process, described by Mandel, et al., U.S. Pat. No. 5,399,597 eliminates the need for an extruder by utilizing a high pressure reactor capable of handling high pressure supercritical $CO_2$. The resins, curatives, flow agents and additives such as UV stabilizers are added to the pressure vessel via a hopper. The $CO_2$ is charged to the vessel and mixing blades are used to help the formulation disperse in the supercritical $CO_2$. Typical pressures are from 1,200 to 3,000 psi, with the operating temperatures ranging from 40° to 80° C. The supercritical $CO_2$ acts as a plasticizing media for the polymer and as an excellent media for solvating and carrying low molecular weight species into the higher molecular weight compounds. The supercritical $CO_2$ mixture is then sprayed into a second pressure vessel where particles are formed, thereby eliminating the need for an extruder.

Amine curing agents that are typically used as ambient curatives are not utilized in the powder coatings industry as most of the reactive aliphatic amines that cure epoxy functional polymers at ambient and low temperatures (i.e. below 100° C.) are liquids in their natural form under ambient conditions. However, when reacted with $CO_2$, amines form carbamate salts, some of which are hygrosopic and pick up moisture and form adhesive gels. The use of $CO_2$ blocked amines has been reported in several patents. Wu, U.S. Pat. No. 4,483,888, described an epoxy resin composition that contained $CO_2$ as a cure retardant. The composition comprised an epoxy resin, a curing agent, a hydrocarbon reactive diluent and $CO_2$. Richardson, U.S. Pat. No. 4,526,721, reported that the pot life of an aqueous mixture composed of an epoxide resin and an amine compound was significantly improved by carbonating the mixture with $CO_2$. Lee et al., U.S. Pat. No. 5,387,619, described a similar process for inhibiting the chemical reaction of a functional organic material by mixing the material with supercritical $CO_2$. Lee el. al. describe how the supercritical fluid "restrains" a chemical reaction between the components. For example, an isocyanate and polyol were mixed in supercritical $CO_2$ and the torque values attached to the stirrer were monitored to record the viscosity of the fluid mixture. It was found that the torque increased significantly when the process conditions were lowered below the supercritical $CO_2$ state. All of these methods described previously utilized the $CO_2$ to inhibit the reaction of amines and epoxies in liquid coating formulation. The isolation of the carbamate salt formed from the reaction of the $CO_2$ and the amine for powder coating applications was not reported in any of these articles. It has generally been believed that the resulting carbamate salts are hygroscopic and decompose under ambient conditions.

Previous descriptions of individual carbamate salts describe the use of silica dispersed in the liquid amine to act as a carrier for the blocked amines, and were used to form elastomeric compounds (Brodoway, U.S. Pat. No. 4,102,801). McGhee, et. al., U.S. Pat. No. 5,223,638, describe the use of the amine carbamate anions in the synthesis of urethanes. Dispersions of amine carbamates were prepared with $CO_2$ and alkyl amines in the presence of the ethylene oxide-propylene oxide copolymer glycerol ether. These compounds were reacted with TDI to form urethane foams (U.S. Pat. No. 5,288,766). Also, reference has been made regarding the use of these compounds as chain extenders for polyurethane prepolymers, (Czech patents, 203381 and 203548). None of these examples of carbamate salt formation isolated the carbamate salt and characterized the compound regarding its decomposition back to the original amine for use in the powder coating industry.

A number of prior art patents describe the formation of carbonic acid salts by reacting $CO_2$ with amines in the presence of water. U.S. Pat. No. 4,469,856 describes the use of non-crystalline amine/carbonic acid salts as useful compounds for polyurea foam generation. U.S. Pat. No. 3,425,964 describes carbamates and carbonic acid salts to be the same compounds and form crystalline compounds. We have found, however, that this is not the case. U.S. Pat. No. 3,425,964 utilizes water to form carbonic acid salts, not carbamates which have a different chemical structure. Amines such as diethyltriamine are used in U.S. Pat. No. 3,320,187 to to form white carbamate salts. However, these compounds have been found to be unstable. These carbamates pick up moisture and degrade to a black compound after a few weeks in the open atmosphere, certainly not a characteristic required for stable powder coating compounds.

It is therefore an object of the present invention to prepare uniform powder particles intimately mixed with a blocked curing agent that may also act as a leveling and flow aid for the production of powder coatings with improved finishes and improved cure profiles.

BRIEF SUMMARY OF THE INVENTION

The present invention is a powder coating composition comprising an amine carbamate which is crystalline at ambient temperature and a solid resin which contains functionalities which react with the resultant amine upon decomposition of the carbamate.

In accordance with this invention, an amine compound in liquid form is converted to a stable white crystalline solid for use as a blocked curative in the manufacture of powder coatings. The amine reacts with the $CO_2$ to form a solid amine carbamate salt which is added to powder coating formulations. Liquid amine is regenerated on heating to act as both a curing agent and a viscosity modifier/leveling aid for the powder coating. The advantages created with the use of this invention are several fold; 1) lower viscosity curatives aid flow thereby creating thinner films with improved finishes; 2) lower temperature curing may be obtained by deblocking amines at temperatures lower than those used in conventional powder coating formulations, thereby opening the powder coating markets to cure coatings on plastics and wood substrates; 3) by deblocking the reactive primary amines the cure times for the conventional powder coating resins may be shortened, possibly leading to greater through-put in coating operations; and 4) as $CO_2$ is a gas, on deblocking the amine the deblocking agent does not create sublimation products which may create flaws on coating surfaces during the substrate curing process within furnaces and ovens.

DETAILED DESCRIPTION OF THE INVENTION

We have developed novel powder coating compositions which comprise a solid resin along with a blocked amine curative. The blocked amine curative is formed by reacting a liquid amine with $CO_2$ to form a solid amine carbamate salt. The liquid amine is typically an amine which is in the liquid state under ambient conditions, although an amine which is a solid under ambient conditions can also be used by heating it to its liquid state prior to reacting it with the $CO_2$ or by dissolving the amine comopund in an appropriate solvent. The $CO_2$ may be in a gaseous, liquid or supercritical state. The solid resins used in this invention can be any oligomer or polymer composition which contains chemical functionality which will react with the resultant amine upon decomposition of the carbamate. The particular resin can be chosen based upon the desired end-use of the powder coating with examples including polymers and copolymers of compounds containing epoxides, unsaturated polyesters, isocyanates, bismaleimides, glycidyl methacrylate copolymers, and styrene/maleic anhydride copolymers. Examples of specific suitable solid resins for use in this invention include solid epoxide compounds composed of diglycidylether of bisphenol A (DGEBA), commercially known as Epon 2042 or Epon 2002 from Shell, or Ciba's G6703, or Dow Der 6225. Also acrylic resins containing epoxy functionality such as glycidyl methacrylate copolymers (Almatex 3402) can be used.

The blocked amine curative; ie the amine carbamate salt is formed from a liquid amine which forms a solid crystalline carbamate salt upon reaction with the gaseous, liquid or supercritical $CO_2$. As used herein "crystalline" carbamate salts are characterized by powder diffraction techniques. A Philips APD 3720 x-ray powder diffractometer was used to obtain the x-ray diffraction patterns created by the crystalline compounds. Examples of amines which are suitable for this invention include those based on cyclohexane derivatives such as 1,4 diaminocyclohexane, 1,2 diaminocyclohexane (Ancamine 1770), 4,4' methylenedi (cyclohexylamine) (Amicure PACM), 3,3' dimethyl-methylenedi(cyclohexylamine) (Ancamine 2049), N-amino ethyl piperazine [Ancamine AEP], 5-amino-1-aminomethyl-1,3,3-trimethyl-cyclohexane (isophoronediamine) and (Ancamine 2068) and oligomeric structures made by coupling these diamines and carbamates made therefrom. Other amines which form crystalline carbamate salts and can be used in this invention include those from linear or branched chain aliphatic diamines, e.g. 1,2 diamino ethane, 1,2 diamino propane, 1,3-diaminopropane, 1,4-diaminobutane, 1,5 diaminopentane, 1,6-diaminohexane, 1,7 diaminoheptane, 1,8 diaminooctane, 1,10 diaminodecane, 1,11-diaminoundecane, 1,12-diaminododecane.

The amine carbamate salt is present in a concentration of from about 0.1 to 30 wt % based upon the total weight of the powder composition, with a concentration in the range of from 1 to 10 wt % being preferred.

In addition to the solid resin and crystalline amine carbamate salt, the powder coating compositions may optionally contain one or more flow modifiers, pigments, light stabilizers, degassing agents, wetting agents, and the like.

The resultant composition is a stable powder coating material which may be stored at ambient conditions for extended periods time. The powder coatings are used by applying them to a substrate to be coated, typically by electrostatic deposition or a fluidized bed technique, although any suitable coating method can be used. The powder coatings are heated to deblock the amine, wherein $CO_2$ is released and the compound converts back to the liquid amine which then reacts with the solid resin. Typically, the coatings are heated to a temperature from about 70° to 190° C. to deblock the amine curative. Depending upon the coating process being used, the deblocking may occur before, during or after the powder is applied to the substrate. For example, some of the $CO_2$ may be released during the extrusion process if temperatures are sufficiently high to create deblocking. In this case, the speed of the extrusion process then becomes important to prevent complete $CO_2$ removal and create a high degree of cross-linking in the extruder.

The amine carbamate salts of the present invention can be prepared individually or in the presence of a polymerization that is being performed using $CO_2$ as the polymerization media. They can be prepared via an atmospheric or high pressure process.

In a typical atmospheric process, liquid amine is added to an inert solvent in a reaction flask and gaseous $CO_2$ is bubbled through the mixture with constant agitation. The reaction vessel is equipped with the necessary cooling as the reaction between the amine and the $CO_2$ is exothermic. Typical inert solvents include but are not limited to methanol, ethanol and tetrahydrofuran. Preferred amines used in the atmospheric carbamate procedure include, but are not limited to, aliphatic diamines, cycloaliphatic diamines, diamines, mono amines as well as compounds that contain tertiary amines and compounds that contain a mixture of primary and secondary amines. It is known that $CO_2$ will react with primary amines and also with secondary amines. The tertiary amines will interact with high pressure $CO_2$ but not react with the $CO_2$ to form covalent bonds. As tertiary amines are known to be catalysts for certain reactions, it is a part of this invention to include amine functional compounds that also contain tertiary amines. In doing so, the reaction between the primary or secondary amine and a second reactive functionality, such as epoxides and isocyanates, will be catalyzed by the presence of the tertiary amine when the primary or secondary amines are deblocked. An example of such an amine is the compound amino ethyl piperazine. This compound contains a primary, secondary and tertiary amine. This amine also forms a stable crystalline carbamate salt.

The carbamate formation is believed to occur through the following pathway, first forming a carbamic acid (which is unstable) and in the presence of a second amine (primary or secondary) the carbamic acid protonates the free amine and forms a salt. This is the form most desirable for powder coating applications. Alternatively, the amine functional compound could contain a hydroxyl functional group that could also react into the powder coating formulation during the final cure stage.

$CO_2+R_1R_2NH=R_1R_2NHCOOH$ $R_1R_2NHCOOH+R_1R_2NH=R_1R_2NHCOO^-+R_1R_2NH$

Where R1 is alkyl, cycloaliphatic, or aromatic, and R2 is independently equal to —H, —$NH_2$, —NHR3, —$CH_3$, $CH_2$–$CH_3$, —$CH_2$—$(CH_2)_n$—$CH_3$ wherein n<30, —OH, —$CH_2OH$.

R2 could also contain a second reactive functionality such as

—NCO, and —COOH.

The choice of the amines is important as some compounds react and form more "amorphous" types of amine carbamate salts. Others are more "crystalline" in nature. The amorphous carbamate salts tend to absorb moisture from the air and decompose the carbamate salt. Some amorphous blocked amines, such as those prepared from the polyethyleneoxide and polypropyleneoxide diamines (Huntsman; Jeffamines), form viscous gels when $CO_2$ is introduced to mixtures of these compounds in inert solvents. The resulting viscosity is reduced overnight under ambient temperatures and pressures, illustrating the conversion back to the original diamine. Such amorphous compounds would not be desirable for the powder coating industry as they readily decompose and have poor shelf stability.

On the contrary, the carbamate salts that form crystalline compounds form stable white crystalline solids that are stable under ambient conditions for periods up to several months. Upon heating does the $CO_2$ evolve and convert the compound back to the liquid amine. This has several advantages for the powder coating industry. First, the deblocking of the amine back to its liquid form provides the powder coating with enhanced flow characteristics as the powdered coating enters the ovens to melt, flow and cure. This enhanced flow created by the low viscosity liquid amine may also provide better finishes and thinner films. Also, the cyclohexane compounds do not contain aromatic character which is known to create yellowing in most coatings. The lack of chemical unsaturation within the amine substrate is therefore another advantage for using these compounds as curatives in the powder coating industry. Utilizing a molecule which is gaseous in its standard state, also provides the powder coating industry with the ability to deblock a curative without releasing a compound that sublimes inside oven chambers. This is a practical problem that occurs when conventional blocked curatives such as isocyanates blocked with e-caprolactam are used. These curatives may deblock on heating and release compounds which outgas and adhere to the oven walls. These sublimation products may fall onto the coating surface and create flaws. A blocked curative that utilizes $CO_2$ has the advantage that $CO_2$ will not create sublimation byproducts. The gaseous $CO_2$ on release to the atmosphere is swept away with the typical oven purge gases.

The following compounds have been found to form carbamates with reasonable shelf stability. Methylenedi (cyclohexylamine) (Amicure PACM), 3.3' dimethylene dicyclohexylamine (Ancamine 2049), dimethylenetri (cyclohexylamine) (Ancamine 2168), 1,2 diamino cyclohexane (Ancamine 1770), isophorone diamine, and N-amino ethyl piperazine (Ancamine AEP). Amines such as cyclohexylamine 2-methylcyclohexyl amine and dicyclohexylamine could also be used to form these carbamate salts.

The alkyl amines such as diethylenetriamine (DETA), triethylenetetramine (TETA), tetraethylenepentamine (TEPA), pentaethylenehexylamine (PEHA), and 1,3 bis (amino ethyl) cyclohexane, all form white solid carbamate salts but quickly decompose in air. To obtain shelf stability for these compounds refrigeration is required.

A typical carbamate salt has from 2 to 80% on a weight to weight basis of $CO_2$ to amine. The preferred composition range is from 5 to 40% and is based on the individual amine compound and its molecular weight.

The following examples are presented to better illustrate the present invention and are not meant to be limiting.

EXAMPLE 1

Synthesis of the Carbamate Salt of Methylenedi (cyclohexylamine) Under Atmospheric Conditions Methylenedi(cyclohexylamine), 507.7 g (Amicure PACM, Air Products & Chemicals) was mixed with 3 liters of tetrahydrofuran (HPLC grade) in a three necked round bottom flask equipped with mechanical agitator, condenser and $CO_2$ purge line. The $CO_2$ feed line was connected to a two stage $CO_2$ regulator on a $CO_2$ cylinder. (Air Products &

Chemicals Analytical grade). The round bottom flask was located in an ice bath and the agitator and $CO_2$ purge started. Upon the initial addition of $CO_2$ a white product appeared on the edges of the glass vessel. After approximately 15 minutes the entire mixture had changed from a clear solution to a white dispersion. The reaction was allowed to proceed for a further 3 hours to ensure that the majority of the diamine had been converted to a carbamate salt. The dispersion was filtered, washed further with THF and the white carbamate powder recovered and dried in first an air circulating oven at 40 C. and then in a vacuum oven overnight. The final product weight was 581.46 g. This illustrates a gain in weight by addition of $CO_2$ to the Methylenedi (cyclohexylamine) of ~14.5 %. A total yield=114.5%. This was equivalent of 1 mole PACM to 0.7 moles of $CO_2$.

EXAMPLE 2

Thermogravimetric Analysis of the Product from Example 1

The resulting compound prepared in Example 1 was placed in a Thermogravimetric Analyzer (TGA) (DuPont model 951) fitted with an infra red detector (Midac FTIR). The sample was heated at 10° C. from ambient conditions to 700° C. in a platinum pan. The purge gas was nitrogen at a rate of 100 cc/min. The resolution on the IR was 4 $cm^{-1}$. The resulting thermogravimetric data described dynamic information of weight loss as a function of temperature. The weight loss of carbon dioxide from the amine carbamate initiated at 75° C. and reached a maximum at 95° C. The amine decomposition occured at a much higher temperature, initiating at 150° C. and reaching a maximum at 200° C. This data clearly describes the deblocking of the carbamate salt at lower temperatrures than the evaporation and decomposition of the liquid amine.

Utilizing a Perkin Elmer Thermogravimetric Analyzer (TGA). A series of isothermal thermogravimetric spectra were obtained for studying the decomposition of the carbamate salt prepared in example 1 at various temperatures as a function time. Weight loss data were obtained for several isothermal runs at 80° C., 90° C., 100° C. and 110° C. The $CO_2$ weight loss at 100° C. was complete after 30 minutes. The $CO_2$ weight loss at 80° C. was complete after 83 minutes.

EXAMPLE 3

Synthesis of PACM Carbamate Under High Pressure Conditions

A 300 cc Autoclave Engineers high pressure reactor fitted with a Magna drive stirrer and the appropriate relief valves, rupture discs, pressure transducers and inlet ports was pressure checked with high pressure nitrogen at 500 psi intervals up to 3000 psi. Following a successful pressure check, the nitrogen was vented to leave approximately 50 psi of nitrogen pressure inside the reactor. Carbon dioxide was then used to purge the reactor three times. Each 002 purge consisted of opening the $CO_2$ valve from the ISCO Model 260D high pressure syringe pump to obtain ~500 psi of $CO_2$ pressure within the reactor. The $CO_2$ pressure was again vented to 50 psi to thoroughly purge the reactor system. With the ISCO $CO_2$ syringe pump running in the constant pressure mode and set to 5200 psi, (at ambient temperatures $CO_2$ density is equal to ~1.0 g/cc), approximately 271 g of $CO_2$ was charged to the reactor. With the agitator and cooling on methylenedi(cyclohexylamine), 25.23 g (Ancamine PACM, Air Products & Chemicals) was added to the reactor using a Thermal Separations high pressure liquid chromatography pump.

On visual inspection of the reactor contents via a fiber optic device located in front of a spherical sapphire window (located within the walls of the reactor), white particles of carbamate were observed to form on immediate addition of the amine to the reactor. After agitating the mixture for ~2 hours the reactor was vented and the solid white powder recovered.

EXAMPLE 4

Synthesis of GMA Acrylic Copolymer in $CO_2$ and Preparing PACM Carbamate In-situ Forming an Intimate Mixture of Polymer and Blocked Curative Methyl methacrylate (60 g, Aldrich Chemical Co.), Butyl methacrylate (15 g, Monomer & Polymer & Dajac Laboratories), Glycidyl methacrylate (20 g, Aldrich Chemical Co.) and a reactive surfactant (polydimethyl siloxane monomethacrylate (5.0 g) were mixed together with the 2,2'-Azobis(2,4 dimethyl-valeronitrile) initiator, (Vazo-52-DuPont 4.0 g). The mixture was purged with nitrogen. The reagent mixture was then added to a monomer feed vessel ready to be pumped into a high pressure reactor.

A 300 cc Autoclave Engineers Reactor fitted with a magnetically driven stirrer and the appropriate relief valves, rupture discs, pressure transducers and inlet ports was pressure checked with high pressure nitrogen at 500 psi intervals up to 1500 psi. Following a successful pressure check, the nitrogen was vented to leave approximately 50 psi of nitrogen pressure inside the reactor. Carbon dioxide was then used to purge the reactor three times. Each $CO_2$ purge consisted of opening the $CO_2$ valve from the ISCO Model 260D high pressure syringe pump to obtain ~500 psi of $CO_2$ pressure within the reactor. The $CO_2$ pressure was again vented to 50 psi to thoroughly purge the reactor system. With the ISCO $CO_2$ syringe pump running in the constant pressure mode, liquid $CO_2$ was added to the reactor (~287 g), pressure was brought to 770 psi @19° C.

Using a Thermal Separations high pressure liquid chromatography pump the PACM diamine (Methylenedi (cyclohexylamine)) was pumped into the reactor. Constant agitation was maintained and the cooling turned on (the reaction between amines and $CO_2$ is exothermic). No exotherm was observed, however a white carbamate salt formed immediately, (as viewed through the sapphire window utilizing a bore scope). The PACM carbamate was allowed to form overnight (17 hours).

The reagent mixture (located in a glass monomer feed vessel hung from a load cell) was pumped into the reactor with the agitator in constant motion. A total of 60.72 g of reagent mixture was added. The reactor pressure was 731 psi @30° C. The temperature was raised to 60° C. to initiate polymerization of the GMA acrylic copolymer in-situ with the PACM carbamate. The reaction was maintained at 60° C. and ~2500psi for a further 24 hours. The reactor was then cooled, vented and the product recovered as a fine white powder. The recovered yield was 84%.

The sample was submitted for isothermal Differential Scanning Calorimetry (DSC) analysis. The cure exotherms at 120° C. showed a maximum after 30 seconds. The exotherm was complete after 15 minutes. These results show excellent cure characteristics for powder coating compounds.

EXAMPLE 5

Forming an Intimate Mixture of Amine Carbamate and a Commercial Epoxy Functional Acrylic Resin using Supercritical $CO_2$ An epoxy functional acrylic resin, 54 g (Almatex 3402, Anderson Development Co.) and 6 g of the carbamate salt of Methylenedi(cyclohexylamine) (PACM), prepared in Example 1, were placed in a 300 cc Autoclave Engineers Reactor equipped with appropriate rupture discs and agitators. The vessel was sealed and 341.5 g of $CO_2$ added via an automatic ISCO syringe pump. The temperature was raised to 65 C. and the pressure maintained at ~5000psi. The mixture was agitated overnight, after which the contents were cooled to ambient conditions and the $CO_2$ vented. The material was analyzed and appeared more particulate in nature as compared to the crystalline form of the glycidyl methacrylate copolymer starting product. This sample was submitted for DSC analysis as described in the previous Example and the isothermal cure spectra obtained. The isothermal DSC results at 100° C., 110° C. and 120° C. all exhibited exotherm peaks within two minutes. The exotherm peaks were complete after 15 minutes showing excellent low tempeature cure profiles.

EXAMPLE 6

Synthesis of Other Amine Functional Compounds Forming Stable Carbamate Salts The following example tabulates the successful preparation of amine carbamate zwitterionic salts from their respective amine compounds. The TGA data, (as obtained in Example 2), describes the temperatures at which the $CO_2$ evolved from the carbamate salts on heating. The temperatures were taken from the maxima of the derivative of the TGA spectra.

| Amine Compound | Stability of Carbamate Salt Under Ambient Conditions | Deblocking Temperature/C. (From TGA Results) |
| --- | --- | --- |
| 3,3' Dimethyl-methylene dicyclohexylamine [Ancamine 2168] | Stable | 84.8° C. |
| 1,2 diamino cyclohexane [Ancamine 1770] | Stable | 100.2 |
| Isophorone diamine [IPDA] | Stable | ~100–110° C. |
| N-Amino ethyl piperazine [Ancamine AEP] | Stable | ~100–110° C. |
| Ancamine 2168 | Stable | Two Peaks 73.1 and 126.5° C. |

EXAMPLE 7

The following example tabulates the preparation of amine carbamate zwitterionic salts from their respective amine compounds. The Thermogravimetric Analysis (TGA) (obtained as detailed in Example 2), describes the temperatures at which the $CO_2$ evolved from the carbamate salts on heating. The temperatures were taken from the maxima of the derivative of the TGA spectra. This table lists those compounds that were not stable under ambient conditions and may provide powder coating formulations with poor shelf stability. However, with the appropriate storage, these amine carbamate salts could be utilized in other applications where the amine reactivity is blocked until the $CO_2$ evolves from the carbamate compound.

| Amine Compound | Stability of Carbamate Salt Under Ambient Conditions | Deblocking Temperature/C. (From TGA Results) |
| --- | --- | --- |
| Dimethyl amine | Unstable [Limited stability when refrigerated] | 79.8° C. (amine evaporated with $CO_2$) |
| Diethylenetriamine (DETA) | Unstable [Limited stability when refrigerated] | 99.2° C. (amine evaporated with $CO_2$) |
| Triethylenetetramine (TETA) | Unstable [Limited stability when refrigerated] | 124° C. |
| Tetraethylenepentamine (TEPA) | Unstable [Limited stability when refrigerated] | 136° C. |
| Pentaethylenehexamine (PEHA) | Unstable [Limited stability when refrigerated] | 170.9 |
| Dimethyl Amino Propyl Amine (DMAPA) | Unstable [Limited stability when refrigerated] | 93.6 |
| 1,3 Busman ethyl Cycle Hexane | Unstable [Limited stability when refrigerated] | NA |
| Diethyleneamine polypropylenoxide diamine (Jeffamine 230) | Unstable [Decomposed back to diamine, immediately on removal of $CO_2$] | NA |

NA = Not Applicable

We claim:

1. A powder coating composition comprising an amine carbamate salt formed by reacting a liquid diamine or hydroxyl-functional amine with $CO_2$ which is crystalline at ambient temperature and a solid resin containing epoxy functionality which will react with the resultant amine upon decomposition of the carbamate.

2. A composition in accordance with claim 1 wherein said liquid diamine is selected from the group consisting of aliphatic diamines and cycloaliphatic diamines.

3. A composition in accordance with claim 2 wherein said liquid diamine is a diamine containing cyclohexyl group(s).

4. A composition in accordance with claim 1 which further comprises one or more additives selected from the group consisting of flow modifiers, pigments, and light stabilizers, degassing agents and wetting agents.

5. A composition in accordance with claim 1 wherein said amine carbamate salt is present in a concentration from about 0.1 to 30 wt % based upon the total weight of the powder composition.

* * * * *